(12) United States Patent
Ogura et al.

(10) Patent No.: US 8,687,224 B2
(45) Date of Patent: Apr. 1, 2014

(54) SERVER APPARATUS, IMAGE FORMING SYSTEM, AND MANAGEMENT METHOD OF IMAGE FORMING DATA

(75) Inventors: Kazuhiro Ogura, Kanagawa-ken (JP);
Shinji Makishima, Shizuoka-ken (JP);
Akihiro Mizutani, Shizuoka-ken (JP);
Toshihiro Ida, Shizuoka-ken (JP);
Yusuke Hamada, Shizuoka-ken (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 343 days.

(21) Appl. No.: 13/169,132

(22) Filed: Jun. 27, 2011

(65) Prior Publication Data
US 2011/0317220 A1 Dec. 29, 2011

Related U.S. Application Data

(60) Provisional application No. 61/359,190, filed on Jun. 28, 2010.

(51) Int. Cl.
*G06K 15/00* (2006.01)
*G06F 3/12* (2006.01)

(52) U.S. Cl.
USPC ........ 358/1.16; 358/1.14; 358/1.15; 358/1.18

(58) Field of Classification Search
USPC ......... 358/1.16, 1.15, 403, 1.1, 1.14, 1.9, 2.1, 358/3.26, 3.28, 537, 400, 401, 443, 448; 382/159, 182; 707/E17.009, 204, 200, 707/205, E17.01, 6, 829
See application file for complete search history.

(56) References Cited

U.S. PATENT DOCUMENTS

| | | | | |
|---|---|---|---|---|
| 7,805,472 | B2 * | 9/2010 | DeBie | 707/829 |
| 8,237,964 | B2 * | 8/2012 | Fan et al. | 358/1.15 |
| 2003/0011803 | A1 * | 1/2003 | Peter et al. | 358/1.14 |
| 2006/0239736 | A1 * | 10/2006 | Kitada | 400/62 |
| 2007/0271308 | A1 * | 11/2007 | Bentley et al. | 707/200 |
| 2008/0151289 | A1 * | 6/2008 | Fukasawa | 358/1.15 |
| 2009/0249346 | A1 * | 10/2009 | Harada et al. | 718/102 |

FOREIGN PATENT DOCUMENTS

JP 2001-209585 8/2001

* cited by examiner

*Primary Examiner* — Ngon Nguyen
(74) *Attorney, Agent, or Firm* — Amin, Turocy & Watson, LLP

(57) ABSTRACT

According to one embodiment, a server apparatus includes a storage unit, a transfer unit, and a management unit. The storage unit stores user identification information and an extension condition with information indicating a print job. If the transfer unit receives an inquiry of a print job including user information from an image forming apparatus, the transfer unit transfers the print job corresponding to the user information included in the inquiry to the image forming apparatus as the inquiry sending source from among the print jobs stored in the storage unit. The management unit deletes a print job, to which an extension condition was added, from among the print jobs stored in the storage unit after the elapse time from the print job receiving time point exceeds the preservation period and the extension condition is then further exceeded.

20 Claims, 11 Drawing Sheets

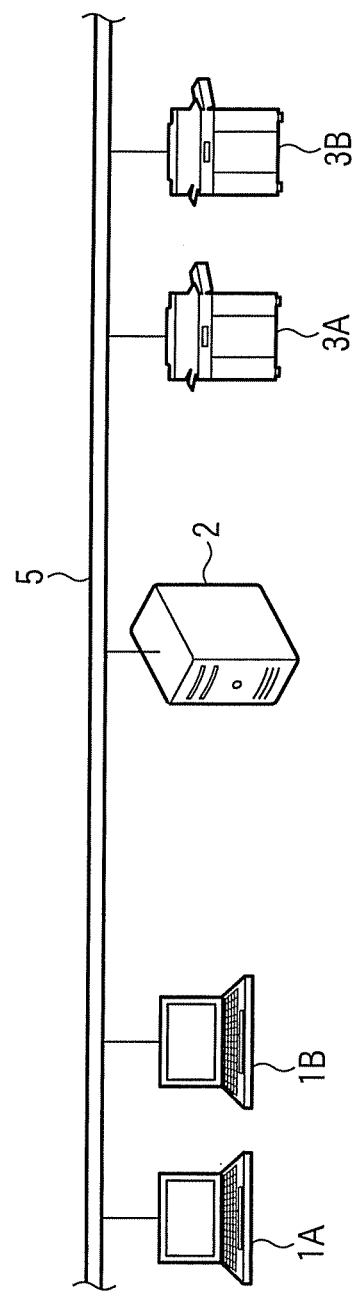
F I G. 1

24b

| User name (user ID) | Authority |
|---|---|
| Andy | A |
| Betty | B |
| Tom | S |

F I G. 3

24c

| Authority | Extendable time |
|---|---|
| S | 24 hours |
| A | 4 hours |
| B | None |

F I G. 4

24d

| Job ID | User name (user ID) | Request time point | Extension time | Job file name |
|---|---|---|---|---|
| 10000101 | Andy | 2009/12/24 12:34:56 | 4:00:00 | tmp10001A.tmp |
| 10000102 | Betty | 2009/12/24 15:35:56 | 0:00:00(none) | tmp10001B.tmp |
| 10000103 | Andy | 2009/12/24 16:12:21 | 0:00:00(none) | tmp10001C.tmp |
| 10000104 | Andy | 2009/12/24 16:13:34 | 0:00:00(none) | tmp10001D.tmp |

F I G. 5

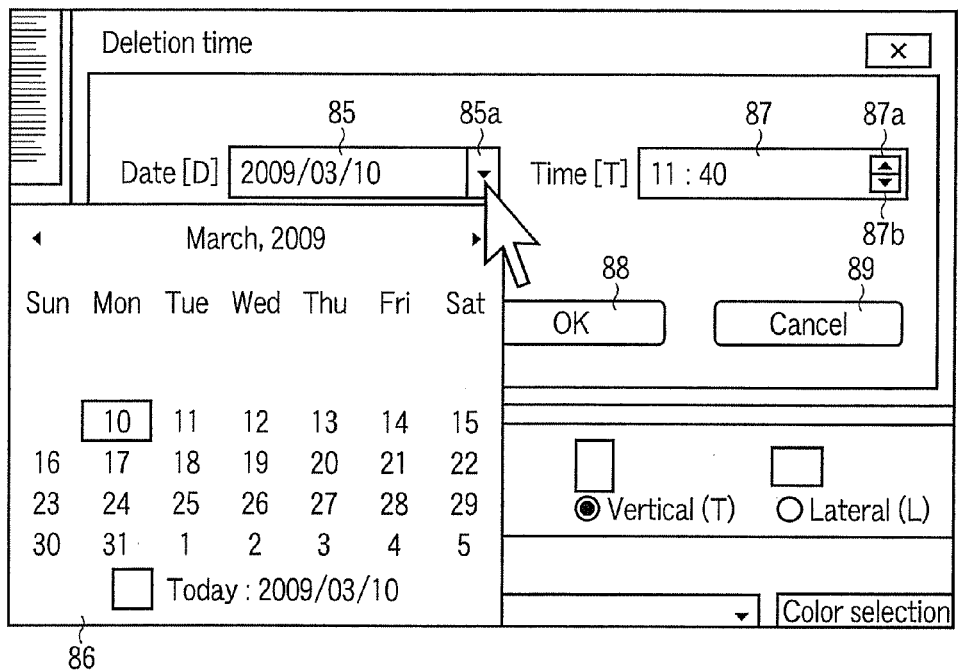
F I G. 10
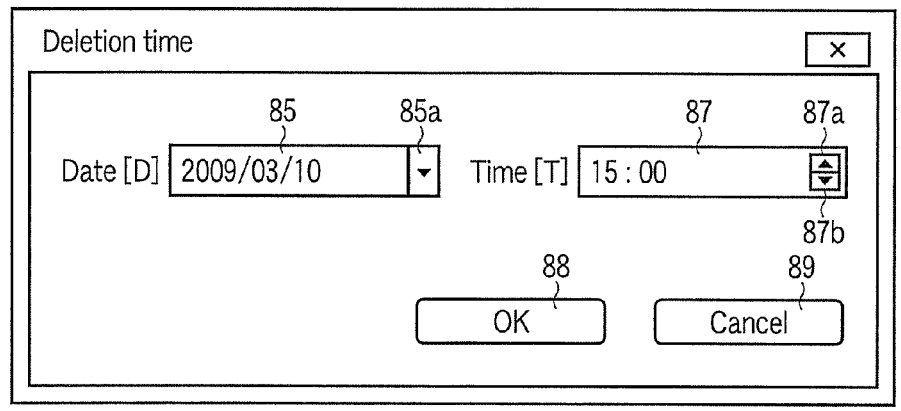
F I G. 11

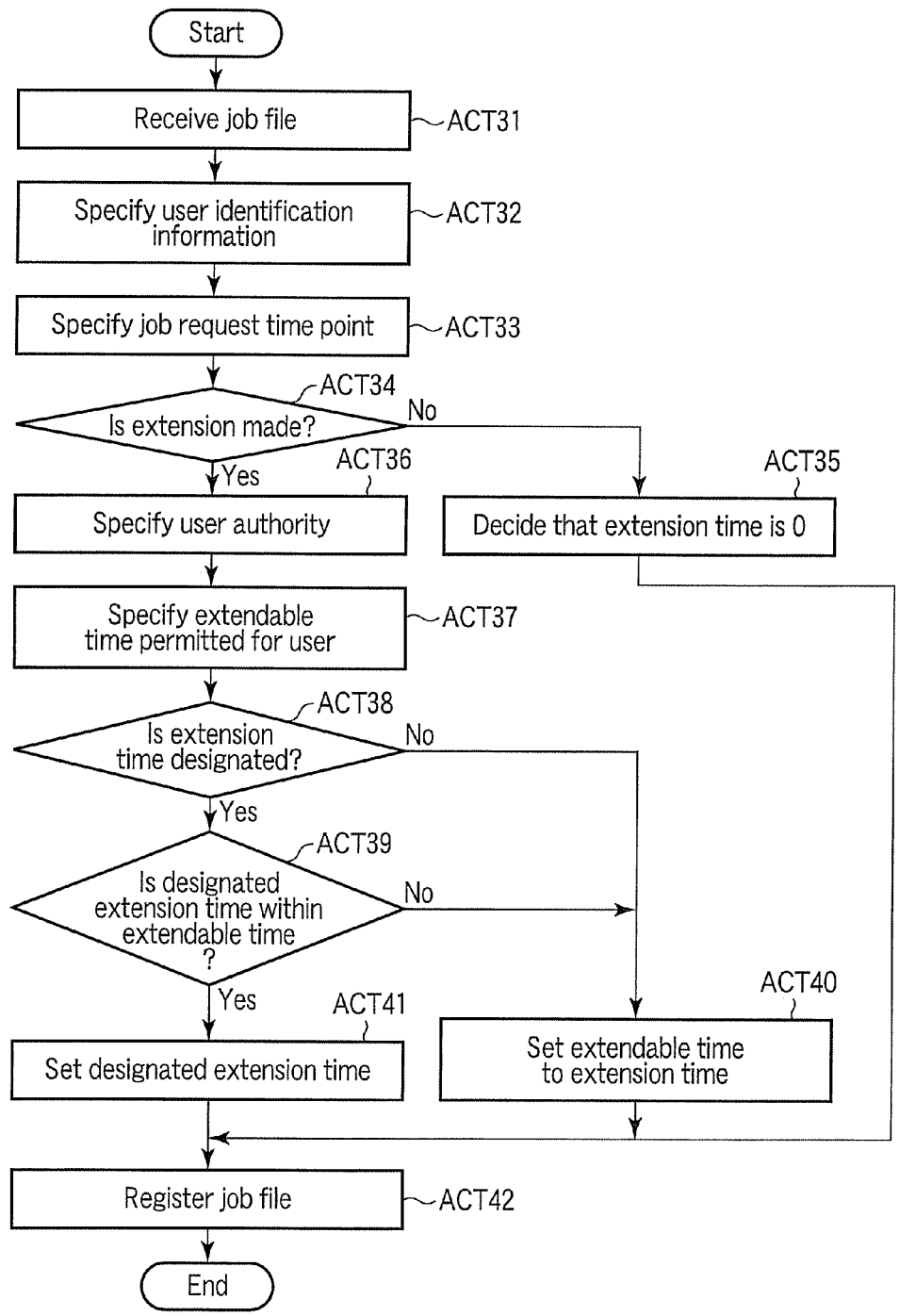
F I G. 12

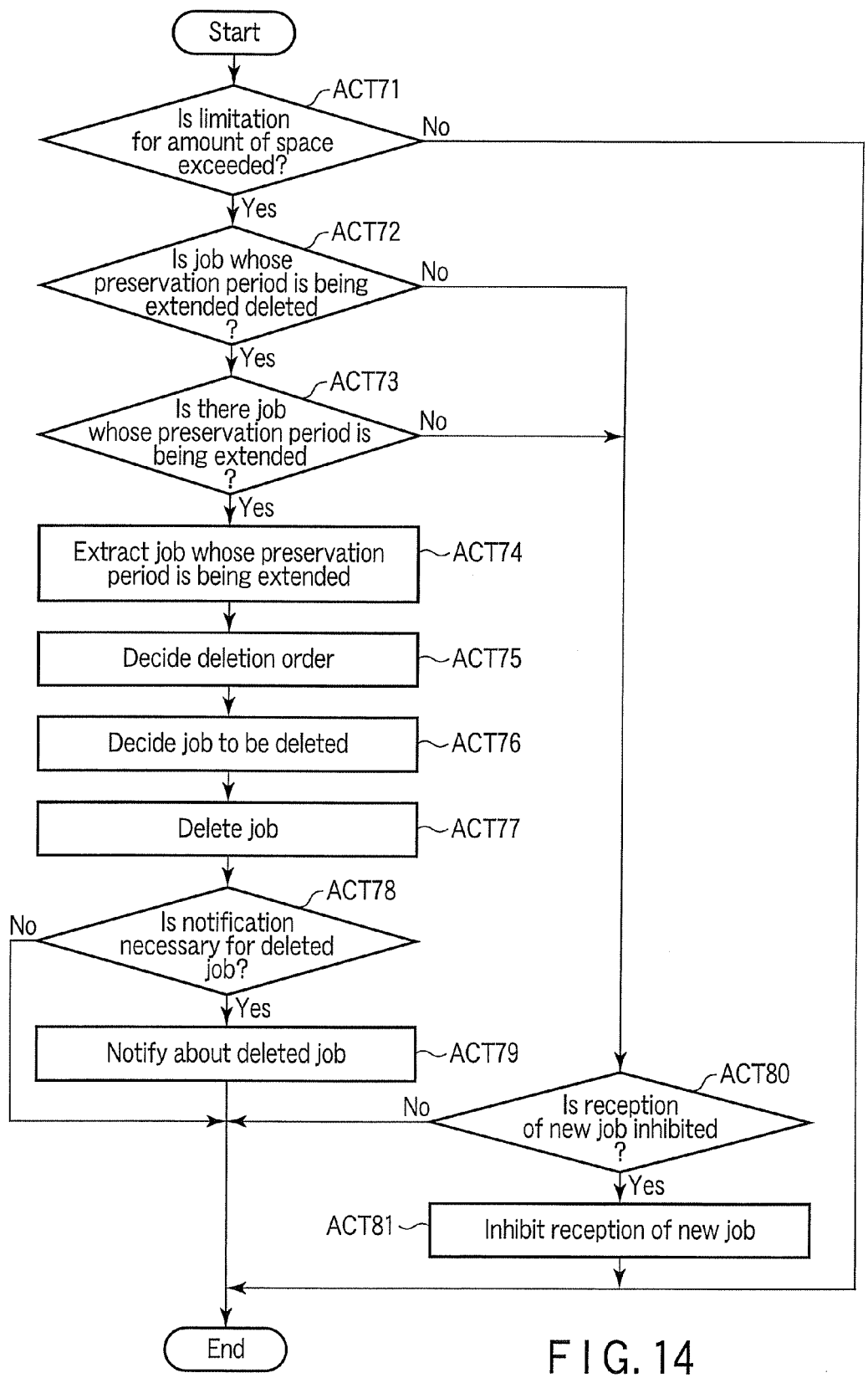
F I G. 14

SERVER APPARATUS, IMAGE FORMING SYSTEM, AND MANAGEMENT METHOD OF IMAGE FORMING DATA

CROSS-REFERENCE TO RELATED APPLICATIONS

This application is based upon and claims the benefit of priority from U.S. Provisional Application No. 61/359,190 filed on Jun. 28, 2010; the entire contents of which are incorporated herein by reference.

FIELD

Embodiments described herein relate generally to a server apparatus, an image forming system, and a management method of image forming data.

BACKGROUND

There is an image forming system which performs image formation by accumulating print data set by a user terminal in a server apparatus and reading the print data accumulated in the server apparatus from an image forming apparatus. According to such an image forming system, the conventional server apparatus deletes print data for which predetermined preservation period elapsed after the accumulation.

BRIEF DESCRIPTION OF THE DRAWINGS

FIG. 1 is a diagram schematically showing a configuration example of an image forming system.

FIG. 3 shows a configuration example of an authority table.

FIG. 4 shows a configuration example of an extension time table.

FIG. 5 shows a configuration example of a job management table.

FIG. 10 shows a display example of an input screen for deletion time.

FIG. 11 shows a display example of an input screen for deletion time.

FIG. 12 is a flowchart illustrating an example of registration processing for a job file in a server.

FIG. 14 is a flowchart illustrating a second example of management processing (deletion processing) for a job file in a server.

DETAILED DESCRIPTION

Figure 2:
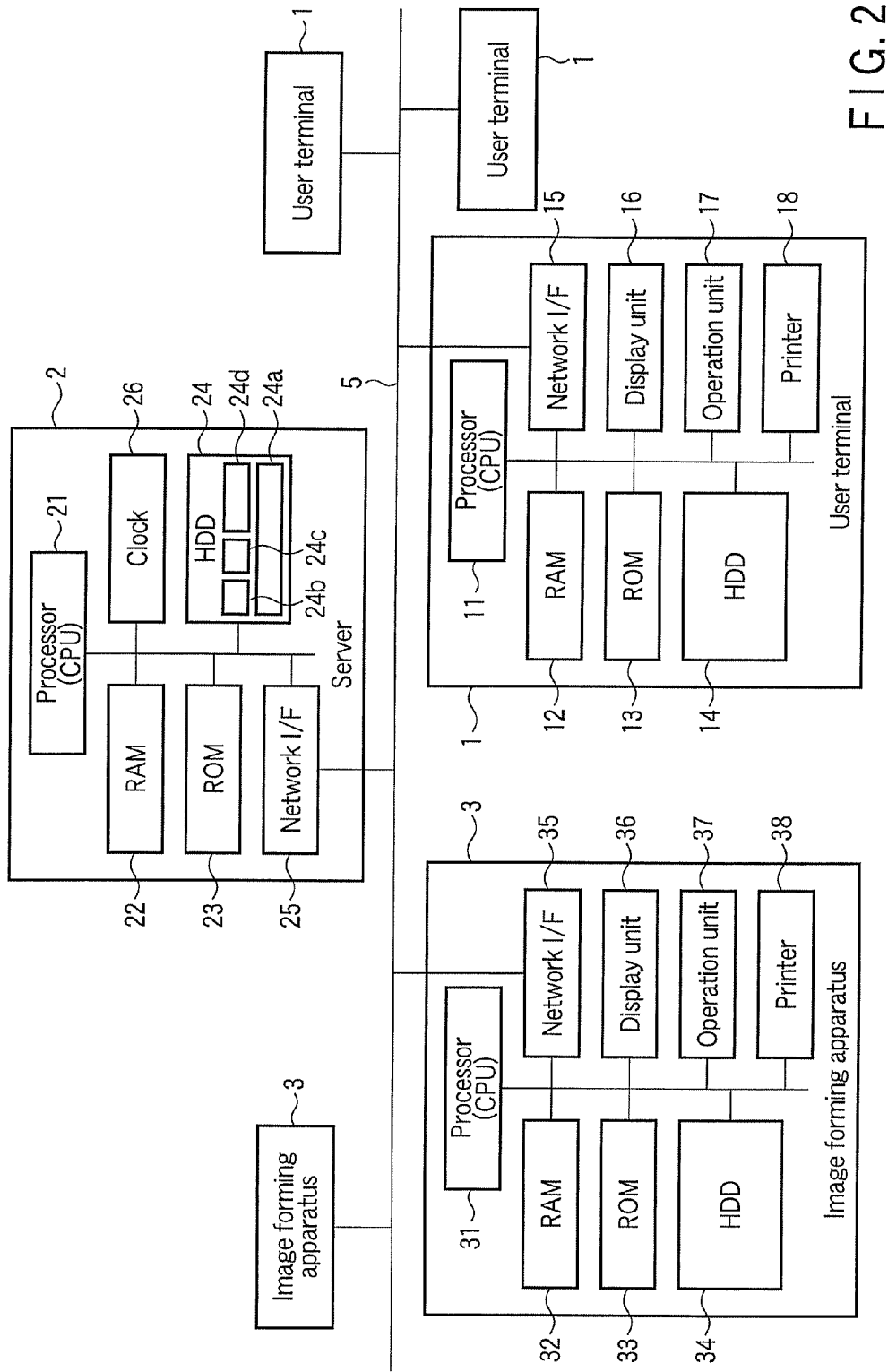
FIG. 2 illustrates blocks showing a configuration example of control systems in a user terminal, a server, and an image forming apparatus.

In general, according to one embodiment, a server apparatus includes a determination unit, a storage unit, a transfer unit, and a management unit. The determination unit determines whether a print job received from an external apparatus includes an extension request of a preservation period of the print job. The storage unit stores user identification information and an extension condition with information indicating the print job if the determination unit determines that the extension request of the preservation period is included. The transfer unit transfers a print job corresponding to user information included in an inquiry to an image forming apparatus as a sending source of the inquiry from among print jobs stored in the storage unit if the inquiry of the print job including the user information is received from an image forming apparatus. The management unit deletes a print job to which an extension condition is added from among the print jobs stored in the storage unit after the elapse time from the print job receiving time point exceeds the preservation period and the extension condition is then further exceeded.

Hereinafter, detailed description will be made of embodiments with reference to the drawings.

FIG. 1 is a diagram schematically showing a configuration example of an image forming system.

In the configuration example shown in FIG. 1, the image forming system includes plural user terminals 1 (1A, 1B, ... ), a print server 2, and plural image forming apparatuses 3 (3A, 3B, ... ). In the image forming system, each user terminal 1, the print server 2, and each image forming apparatus 3 are connected to the network 5. The network is constructed by a wired or wireless communication. The network 5 is not limited to the network within a local area. For example, the network 5 may include wide area network, such as the Internet.

This image forming system is the system with a function (referred to as pull print) in which a user accumulates a print job requested from the user terminal 1 in the server 2 and the print job accumulated in the server 2 is executed in response to the user operation using the image forming apparatus 3.

The user terminal 1 is the terminal apparatus used by a user. The user terminal 1 is applicable as long as it is a device capable of communicating through the network 5. For example, the user terminal 1 may be a personal computer or a mobile-type terminal apparatus. The user terminal 1 includes a user identification function of obtaining user identification information for uniquely specifying a user. In this embodiment, the user terminal 1 obtains the user identification information at least if the pull print is instructed. The user terminal 1 activates a printer driver program (hereinafter, referred to as a printer driver) for the pull print in response to the print instruction by the user. The user terminal 1 generates a job file (print data) indicating print contents instructed by the user by causing a processor to execute the printer driver. The user terminal 1 stores the user identification information and the job request time point in the job file. The user terminal 1 transfers the generated job file to the printer server 2.

In addition, the user identification information and the job request time point may be specified by the printer server 2. For example, the printer server 2 may specify the user identification information based on the information obtained from the user terminal 1 connected to transfer the job file. In addition, the printer server 2 may set the time point at which the job file is received from the user terminal 1 to the request time point.

The server 2 is configured by a server computer. The server 2 includes a function of communicating with each user terminal 1 and each image forming apparatus 3 through the network 5. The server 2 accumulates the job file as print data requested from the user terminal 1. The server 2 associates and stores the job file with the information such as the user identification information indicating a user, the job request time point, the extension condition (for example, extension time), and the like. The server 2 manages the job file based on a predetermined preservation condition (for example, preservation period or an amount of space in the storage region). For example, the server 2 automatically deletes the job file, for which the extension time is not set, after the elapse of a predetermined preservation period. In addition, the server 2 deletes the job file, for which the extension time is set, after the extension by the extension time after the elapse of the predetermined preservation period.

Moreover, the server 2 receives a job inquiry (job file transfer request) from the image forming apparatus 3 for which the user (user identification information) was designated. The server 2 which received the job inquiry extracts the job file (print data) corresponding to the user identification information designated by the inquiry. The server 2 sends the extracted job file (a list of the extracted job files if plural job files are present) to the image forming apparatus 3.

Each image forming apparatus 3 is configured by a digital composite machine (MFP), for example. The image forming apparatus 3 includes a printer function, a network communication function, and a user identification (user authority) function. The image forming apparatus 3 decides the user identification information specifying the user as an operator by the user identification function. The user identification information is applicable as long as it is the information which can determine the user associated with the job by the server 2. For example, the user identification information may be a user ID input by the operator in the log-in processing to the image forming apparatus 3 or may be information obtained as a result of the user authority processing with the authority information such as a password or biological information input by the operator.

If the pull print is executed, the image forming apparatus 3 inquires the print job data which can be executed by the user specified by the user identification function, at the server 2. For example, the image forming apparatus 3 sends the job file inquiry (job file transfer) corresponding to the user identification information obtained by the user identification function, through the network 5 to the server 2. The image forming apparatus 3 obtains the job file (print data), which can be printed by the user, from the server 2.

If the job file is obtained from the server 2, the image forming apparatus 3 executes print processing based on the job file obtained from the server 2. In addition, if plural job files for the designated user identification information exist in the server 2, the image forming apparatus 3 allows the user to select a job file, for which printing is executed, from the list of the obtained job files and executes the print processing based on the job file selected by the user.

Next, description will be made of a configuration of control systems of the user terminal 1, the server 2, and the image forming apparatus 3.

FIG. 2 illustrates blocks showing a configuration example of control systems in the user terminal 1, the server 2, and the image forming apparatus 3.

First, description will be made of the configuration of the user terminal 1.

Each user terminal 1 includes a processor (CPU) 11, a RAM 12, a ROM 13, an HDD 14, a network interface (I/F) 15, a display unit 16, an operation unit 17, and a clock 18 as shown in FIG. 2.

The processor 11 is a CPU, for example. The processor 11 is in charge of the overall control of the user terminal 1. The processor 11 implements various processing functions by executing a program stored in the ROM 13 or the HDD 14. The RAM 12 is a working memory. The ROM 13 stores the control program and the control data which is in charge of the basic operations of the user terminal 1. The HDD 14 is a storage apparatus for data storage. The HDD 14 stores print target data such as an image, an application program (for example, the printer driver) executed by the processor 11, the user authority data, and the like.

The network interface 15 is an interface for the data communication with each apparatus on the network 5. The display unit 16 displays an operation guide and the like. For example, if the processor 11 executes the printer driver, the display unit 16 displays a print setting screen (print instruction screen). The operation unit 17 is for allowing a user to input information. The operation unit 17 is configured by a keyboard, a mouse, or a touch panel provided in the display unit 16. The clock 18 is a timekeeper for the current time point.

In the user terminal 1, the processor 11 implements the user identification function by executing the program. The user identification function may be the user ID input by the user in the log-in processing or may the user information in the authority processing with the authority information such as a password or the like. For example, the user ID is input by the user in the user's log-in processing during the activation processing of the user terminal 1. In addition, the user identification information may be obtained in the user authority processing executed when the user instructs the pull print.

Moreover, the processor 11 receives the user's setting and registration of the pull print by executing the printer driver for the pull print in the user terminal 1. For example, the processor 11 causes the display unit 16 to display a print setting screen for the pull print by executing the printer driver and receives the print setting contents input by the user through the operation unit 17. If the user instructs the pull print execution (registration), the processor 11 generates the job file (print data) indicating the print contents and transfers the generated job file to the server 2.

Next, description will be made of the configuration of the server 2.

The server 2 includes a processor (CPU) 21, a RAM 22, a ROM 23, an HDD 24, a network interface (I/F) 25, and a clock 26 as shown in FIG. 2.

The processor 21 is a CPU, for example. The processor 21 is in charge of the overall control of the server 2. The processor 21 implements various processing functions by executing the program stored in the ROM 23 or the HDD 24. The processor 21 implements a function of managing a job supplied form the user terminal 1 and printed in the image forming apparatus by executing the program. The RAM 22 is a working memory. The ROM 23 stores the control program and the control data which are in charge of the basic operations of the server 2. The network interface 25 is an interface for data communication with each apparatus on the network 5. The clock 26 is a timekeeper for a current time point.

The HDD 24 is a storage apparatus for data storage. The HDD 24 stores the program executed by the processor 21 in order to implement management functions for the job designated by the job file. In addition, the HDD 24 stores the job file indicating the job contents and the management information of the job file. For example, the HDD 24 includes a storage region 24*a* which stores the job file. In addition, the HDD 24 includes an authority table 24*b* which indicates the authority given to each user, an extension time table 24*c* which indicates the extendable time set for each authority, and a job management table 24*d* which manages the job file.

Next, description will be made of the configuration of the image forming apparatus 3.

The image forming apparatus 3 includes a processor (CPU) 31, a RAM 32, a ROM 33, an HDD 34, a network interface (I/F) 35, a display unit 36, an operation unit 37, and a printer 38 as shown in FIG. 2.

The processor 31 is a CPU, for example. The processor 31 implements various processing functions by executing the control program stored in the ROM 33 or the HDD 34. The RAM 32 is a main memory which functions as a working memory. The ROM 33 stores the control program and the control data which are in charge of the operations of the image forming apparatus 3. The HDD 34 is a storage apparatus for data storage. The network interface 35 is an interface communicating with the server 2 through the network 5.

The display unit 36 displays an operation guide or the like. The operation unit 37 is allowing a user to input information. The display unit 36 and the operation unit 37 are configured by an operation panel including a display apparatus in which a hard key and a touch panel are incorporated, for example. To execute the pull print of the job file registered in the server 2, the user inputs the user identification information by the operation unit 37 and instructs the print execution with the job file corresponding to the user identification information obtained from the server 2.

The printer 38 forms the image data included in the print data in color or in black and white on a sheet based on the print conditions included in the job file (print data). The printer 38 is an electrophotographic image forming apparatus, for example. However, the printer 38 is not limited to the electrophotographic type, and a printer which performs image formation based on another print scheme, such as an ink-jet scheme or a thermal transfer scheme, is also applicable.

Next, description will be made of a configuration example of the tables 24b, 24c, and 24d provided in the HDD 24 of the server 2.

The authority table 24b stores the authority given to each user in association with the user specification information which specifies each user. FIG. 3 shows a configuration example of the authority table 24b. In the configuration example shown in FIG. 3, the authority table 24b stores information indicating the authority given to each user in association with the user ID as the user identification which indicates each user.

The extension time table 24c stores extendable time as a maximum time up to which the extension is allowable in association with each authority. FIG. 4 shows a configuration example of the extension time table 24c. In the configuration example shown in FIG. 4, the extension time table 24c stores the extendable time in association with each authority. By referring to the authority table 24b and the extension time table 24c, it is possible to determine the extendable time set for each user.

The job management table 24d stores the user identification information, the request time, and the extension time (extension condition), and the like in association with the job file. FIG. 5 shows a configuration example of the job management table 24d. In the configuration example shown in FIG. 5, the job management table 24d stores the job ID, the user name (user ID), the authority, the job request time point, the extension time, and the job file in association with each other. The extension time is an extension condition with respect to the job file. In the example shown in FIG. 5, "0" is set as the extension time for the job file without extension while the extension time is set for the job file with extension. In addition, the time within the maximum extension time (extendable time) which can be set for the authority of each user is set as the extension time stored in the job management table 24d.

Next, description will be made of the functions of registering and managing the job in the server 2.

Figure 6:
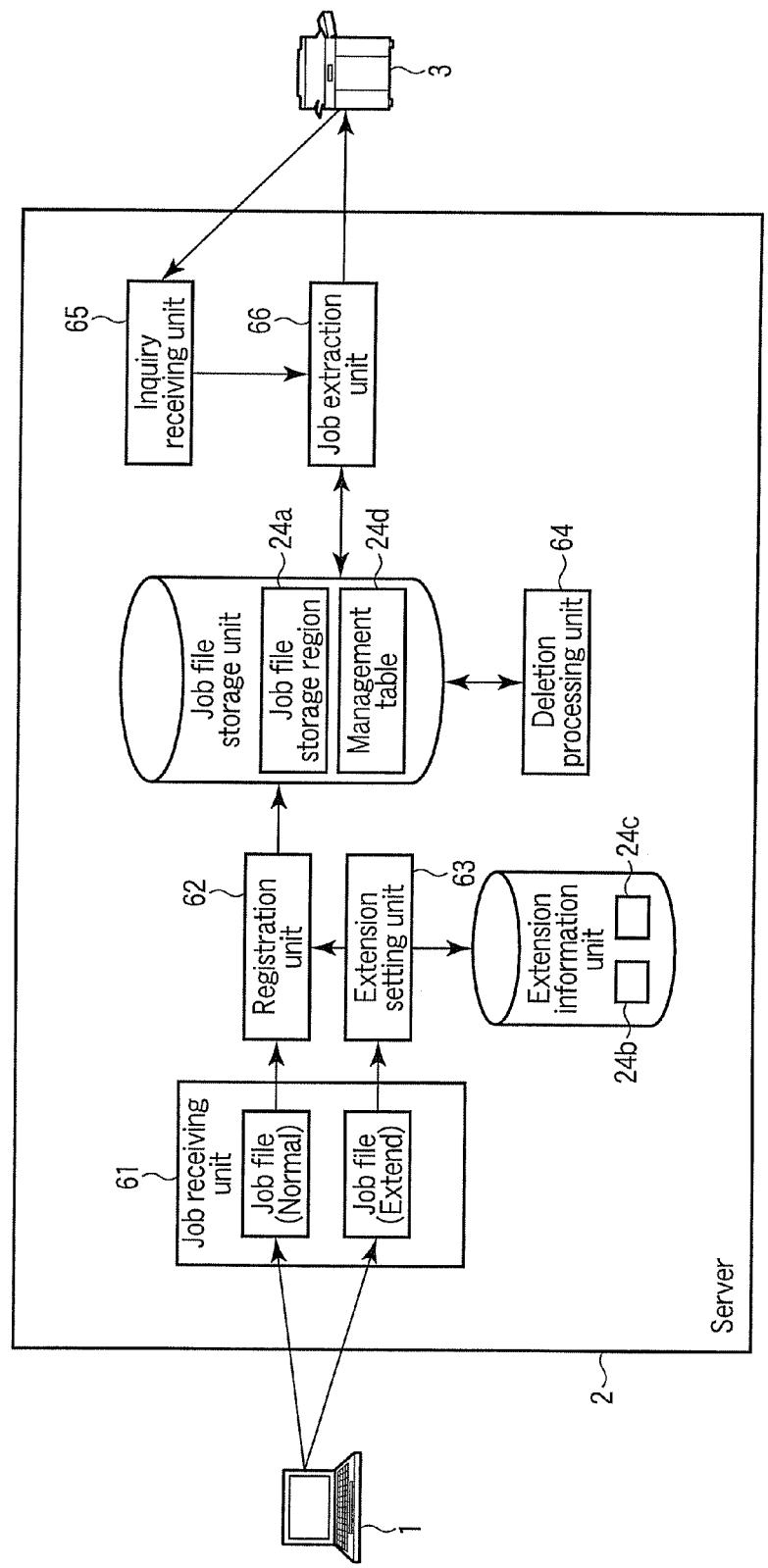
FIG. 6 is a diagram illustrating functions of registering and managing a job in a server.

FIG. 6 is a diagram illustrating the functions of registering and managing the job in the server 2.

As shown in FIG. 6, the server 2 includes a job receiving unit 61, a registration unit 62, an extension setting unit 63, a deletion processing unit 64, an inquiry receiving unit 65, and a job extraction unit 66 as functions of managing the job. The job receiving unit 61, the registration unit 62, the extension setting unit 63, the deletion processing unit 64, the inquiry receiving unit 65, and the job extraction unit 66 are processing functions executed by the processor 21 executing the program installed in the HDD 24, for example.

The job receiving unit 61 receives the job file (print data) received by the communication interface 25 from the user terminal 1. If the job receiving unit 61 receives the job file, the job receiving unit 61 decides which information is to be stored (registered) in association with the received job file. If the job file includes the user identification information and the job request time point, for example, the job receiving unit 61 extracts the user identification information and the job request time point from the job file.

If the job file does not include the user identification information, the job receiving unit 61 specifies the user identification information based on the information obtained form the user terminal 1 which is a job file sending source. In addition, if the time point at which the server 2 receives the job file is set to the job request time point, the job receiving unit 61 sets the current time point measured by the clock 26 to the job request time point.

Moreover, if the job file is received, the job receiving unit 61 classifies the received job file into the job file without extension condition or the job file with the extension condition. The extension condition is the condition for extending the preservation of the job file whose predetermined preservation condition such as a predetermined preservation period is exceeded in the server 2. In this embodiment, the extension time is mainly assumed as the extension condition. The job receiving unit 61 passes the job file without extension condition to the registration unit 62 as it is. In addition, the job receiving unit 61 passes the job file with extension condition to the extension setting unit.

The registration unit 62 stores the job file in the storage region 24a of the job file and stores in the management table 24d the management information for the job file stored in the storage region 24a. In addition, the job file itself may be stored in the storage region 24a by the job receiving unit 61 in the job receiving processing.

For example, the registration unit 62 stores in the management table 24d the user identification information and the job request time point in association with the information (job file name) indicating the job file, as the management information for managing the job file without extension condition. For example, the registration unit 62 stores the extension time "0" (information indicating that no extension is made) in association with the job file without the extension condition in the management table 24d in the configuration example shown in FIG. 5.

In addition, the registration unit 62 stores in the management table 24d the user identification information, the job request time point, and the extension condition (extension time) set by the extension setting unit 63 in association with the information (job file name) indicating the job file, as the management information for managing the job file with extension condition.

The extension setting unit 63 sets the extension condition (for example, extension time) with respect to the job file with extension condition. The extension setting unit 63 may set the time designated by the user for the job file to the extension time, or may set the maximum value (extendable time) of the extension time which can be set by the user at the user's request for the extension, for example.

The extension setting unit 63 determines the extendable time given to the user of the job file based on the information stored in the authority table 24b and the extension time table 24c, for example. The extension setting unit 63 decides the authority given to the user of the job file based on the authority table 24b and determines the extendable time set for the user's authority based on the extension time table 24c.

The extension setting unit 63 may be configured to confirm whether indicated extension time is within the extendable time with respect to the user when the user designates the extension time. If the designated extension time is within the extendable time of the user, the extension setting unit 63 sets the designated extension time as the extension time for the job file. If the designated extension time exceeds the extendable time, the extension setting unit 63 sets the extendable time of the user to the extension time for the job file. Alternatively, it is also applicable that the extension setting unit 63 makes setting such that the job file does not include the extension condition, or that the extension setting unit 63 notifies the user of the fact that the extension time designated for the job file cannot be set, if the designated extension time exceeds the extendable time.

The extension setting unit 63 passes the job file, for which the extension time is set as the extension condition, to the registration unit 62. In such a case, the registration unit 62 stores the job file itself with the extension condition in the storage region 24a and stores in the management table 24d the user identification information, the job request time, and the extension condition set by the extension setting unit 63 (extension time) in association with the information (job file name) indicating the job file.

The deletion processing unit 64 deletes the job file stored in the storage region 24a based on predetermined preservation conditions such as a preservation period and the like and the extension condition (extension time) which can be set by the user. The deletion processing unit 64 performs the deletion processing at a predetermined interval (for example, 5-minute interval). For example, the deletion processing unit 64 determines whether the storage period for each job file exceeded the preservation period. If the deletion processing unit 64 detects the job file whose storage period exceeded the preservation period, determination is made regarding whether the extension time was set for the job file. The deletion processing unit 64 deletes the job file, whose storage period exceeded the preservation period, for which extension time was not set.

If the extension time was set for the job file whose preservation period is exceeded, the deletion processing unit 64 calculates the deletion time based on the preservation period and the extension time. If the deletion time is calculated, the deletion processing unit 64 determines whether the storage time of the job file, whose preservation period is exceeded, exceeds the deletion time. The deletion processing unit 64 deletes the job file whose preservation period is exceeded and the deletion time including the extension time is further exceeded.

In addition, the deletion processing unit 64 may provide various limitations other than the extension time when extension is made to preserve the job file. For example, the deletion processing unit 64 may provide a limitation on the amount of the space in the storage region 24a. In such a case, if the limitation on the amount of the space in the storage region 24a is exceeded, the deletion processing unit 64 may delete the job file selected based on a predetermined reference from among the job files whose preservation time is extended. For example, if the limitation on the amount of the space in the storage region 24a is exceeded, the deletion processing unit 64 may delete the selected job files from among the job files whose preservation time is extended, in the order from the job file whose remaining time until the deletion time is the shortest, the order of the authority given to the users, the order of the job types, or the like.

The inquiry receiving unit 65 receives the inquiry of the job file from the image forming apparatus 3. The image forming apparatus 3 sends the request (inquiry) for the transfer of the job file designating the user identification information in response to the user's operation to the server 2. In the server 2, the inquiry receiving unit 65 commands the job extraction unit 66 to extract and transfer the job file corresponding to the user identification information designated in response to the inquiry received from the image forming apparatus 3.

The job extraction unit 66 extracts the job file corresponding to the designated user identification information and transfers the extracted job file to the image forming apparatus 3. For example, the job extraction unit 66 detects the designated user identification information from the management table 24d. If the user identification information is detected from the management table 24d, the job extraction unit 66 specifies the job file name corresponding to the detected user identification information. The job extraction unit 66 reads the job file with the specified name from the storage region 24a and transfers the job file to the image forming apparatus 3 as the inquiry source. In addition, the job extraction unit 66 deletes the job file which was transferred to the image forming apparatus 3. Alternatively, the job file which was transferred to the image forming apparatus 3 may not be deleted but stored.

In addition, if plural job files corresponding to the designated user identification information are detected, the job extraction unit 66 may transfer a list of the detected plural job files to the image forming apparatus 3. If the list of the plural job files is sent, the job extraction unit 66 may transfer the job file designated by the image forming apparatus 3 from the list of the job files.

Next, description will be made of the pull print setting processing in the user terminal 1.

Figure 7:
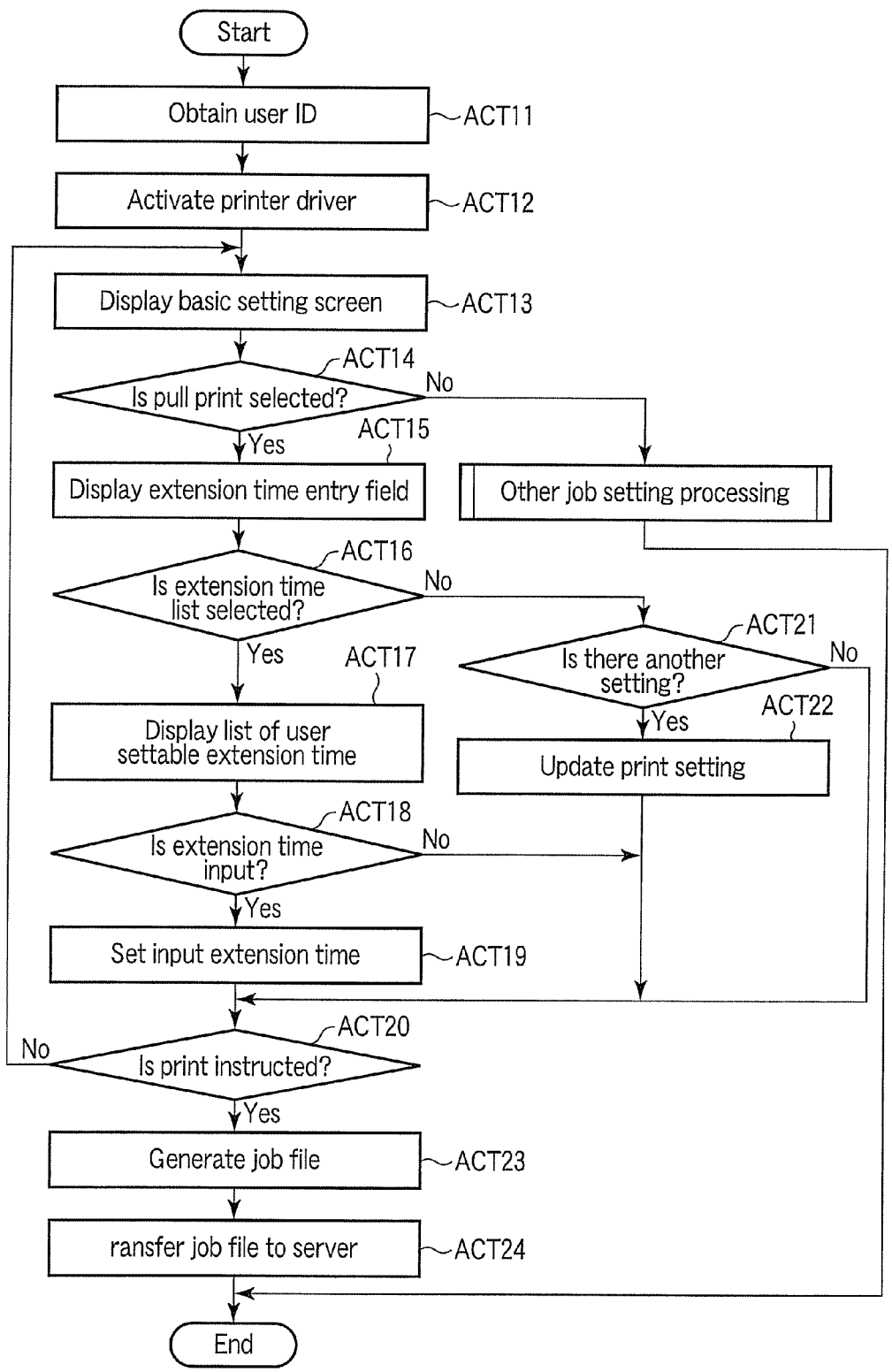
FIG. 7 is a flowchart illustrating an example of setting processing by a pull print in a user terminal.

FIG. 7 is a flowchart illustrating an example of the pull print setting processing in the user terminal 1.

In the user terminal 1, the pull print is set by the processor 11 executing the printer driver. In the operation example shown in FIG. 7, the user terminal 1 obtains the user ID of the user who operates the user terminal 1 before the activation of the printer driver (for example, at the time of the activation processing of the user terminal) (ACT 11). If the pull print is executed, the user instructs the printing by the operation unit 17 while the image data (or document data) as the print target is designated. If the print is instructed, the processor 11 activates the printer driver (ACT 12).

If the printer driver is activated, the processor 11 firstly causes the display unit 16 to display a basic print setting screen (ACT 13). In the basic print setting screen, print (job) types can be selected. In addition, in the basic print setting screen, it is possible to designate the basic setting items relating to the printing such as the sheet size, the paper discharge tray, the number of copies, the print direction, the color mode, and the like.

If the user selects the pull print as the job type by the operation unit 17 in the basic print setting screen (ACT 14, YES), the processor 11 displays an entry field for the extension time in the display unit 16 (ACT 15). The entry field for the extension time may be a button which instructs whether or not an extension is necessary, or an entry field in which the user designates (or selects) the desired extension time, or an entry field in which the desirable scheduled deletion time (deletion time) is input. In the operation example shown in FIG. 7, the entry filed for the extension time displays the plural candidates for the extension time in response to the user's operation, and the user selects the desired extension time from the candidates for the extension time.

That is, if the user instructs the display of a list of the candidates for the extension time by the operation unit 17 (ACT 16, YES), the processor 11 selects the candidates for the extension time which can be set by the user and displays the list of the candidates for the selected extension time in the display unit 16 (ACT 17). For example, the processor 11 determines the maximum extension time (extendable time) which can be set by the user and selects the extension time at each predetermined interval up to the extendable time as the candidates. The user's extendable time may be obtained from the server 2 by designating the user identification information and inquiring at the server 2. In addition, the extendable time for the user as the operator of the user terminal 1 may be stored in advance in the HDD 14 or the like in the user terminal 1.

If the list of the candidates for the extension time is displayed in the display unit 16, the user selects the desired extension time by the operation unit 17. If the user selects one candidate of the extension time (ACT 18, YES), the processor 11 sets the extension time selected by the user to the extension time for the job (ACT 19).

In addition, if the setting item other than the extension time is selected in the setting screen (ACT 16, YES), the processor 11 updates the print setting for the job in accordance with the setting contents instructed by the user (ACT 22) if the setting information regarding the selected setting item is input (ACT 21, YES).

The user who completed the print setting instructs the execution of the print (job) registration. If the execution of the job registration is instructed (ACT 20, YES), the processor 11 generates the job file (print data) including the image data as the print target and the information indicating the current print setting (ACT 23). For example, the processor 11 stores the obtained user ID in the generated job file as the user identification information. In addition, the processor 11 may store the time point at which the execution of job registration is instructed to the generated job file (the current time point measured by the clock 18), for example, as the job request time point. If the job file is completed, the processor 11 accesses the server 2 by the communication interface 15 through the network 5 and transfers the generated job file to the server 2 (ACT 24).

With the above processing, the user can designate in the user terminal 1 the extension time for the preservation period of the job file in the server 2. As a result, the preservation time can be extended in accordance with the extension period designated by the user for the job file of the pull print managed by the server 2 during the predetermined preservation period. In addition, the extension time can be set within the limitation up to the maximum value (extendable time) of the extension time set for the user. With such a configuration, it is possible to prevent the extension time which exceeds the extendable time set for a user from being set and thereby to suppress the degradation in terms of security due to the unlimited setting of the extension time.

Next, description will be made of the display example of the setting screen displayed in the display unit of the user terminal 1.

Figure 8:
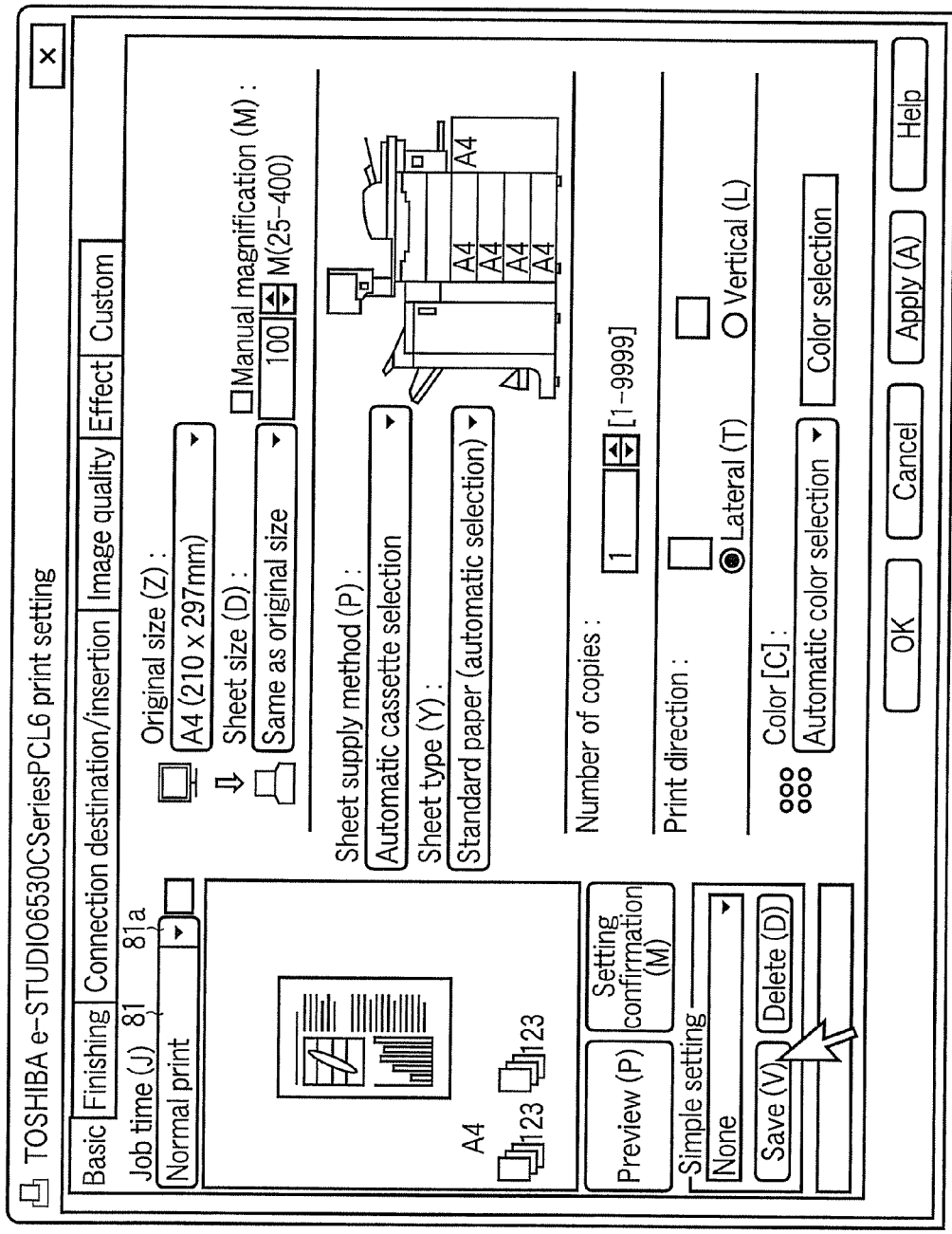
FIG. 8 shows a display example of a basic print setting screen.
Figure 9:
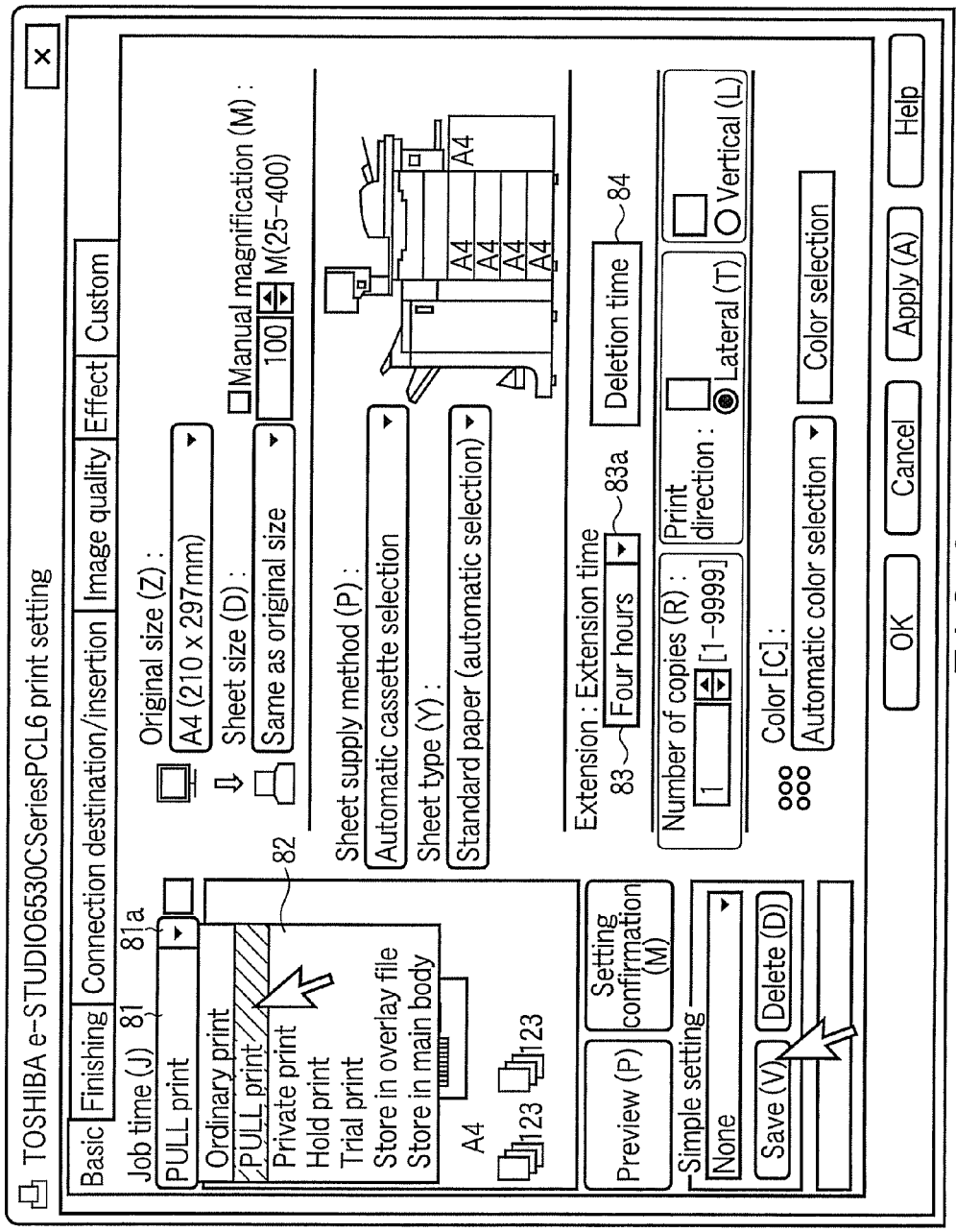
FIG. 9 shows a display example of a basic print setting screen.

FIGS. 8 and 9 show display examples of the basic print setting screen.

In the display examples shown in FIGS. 8 and 9, the display unit 16 displays a print type entry field 81 as a setting filed of the print job type. The print type entry field 81 is a field into which the print type is input. If the pull print is executed, pull print can be set by inputting the pull print in the print type entry field 81.

In the display examples shown in FIGS. 8 and 9, the print type entry field 81 includes a button 81*a*. If the button 81*a* is input, the display unit 16 displays a selectable print type list 82 on the lower side of the print type entry field 81 as shown in FIG. 9. By selecting the pull print from the print type list 82, the pull print is input to the entry field 81, and the print setting for the pull print can be made.

If the pull print is selected from the print type list 82, the display unit 16 displays the extension condition entry field 83 in the setting screen as shown in FIG. 9. The extension condition entry field 83 is a field into which the extension time as the extension condition for extending the preservation period of the job file is input. If the preservation period for the job file in the server 2 is extended, the user inputs the extension time in the entry field 83.

In the display example shown in FIG. 9, the extension condition entry field 83 includes a button 83*a*. If the button 83*a* is input, the display unit 16 displays a selectable extension time candidate list. As the extension time candidates, a list is displayed of extension time candidates within the maximum extension time (extendable time) which can be set by the user. By selecting one extension time candidate from the extension time candidate list, the extension time designated by the user is input to the entry field 83.

In the display example shown in FIG. 9, an icon 84 which displays "deletion time" is displayed as well as the extension condition entry field 83. The icon 84 is a button for designating the deletion time of the job file by the user. If the icon 84 is selected, the display unit 16 displays an input screen (input window) for the deletion time. FIGS. 10 and 11 shows display examples of the input screen for the deletion time. In the display examples shown in FIGS. 10 and 11, an entry field 85 and an entry field 87 for designating the deletion time with date and time are displayed.

The entry field 85 includes a button 85*a*. If the button 85*a* is input, the display unit 16 displays a calendar 86 in which the date can be selected, as shown in FIG. 10. The date can be selected in this calendar 86. In addition, the entry field 87 includes buttons 87*a* and 87*b*. The time point displayed in the entry field 87 is incremented by predetermined time every time the button 87*a* is input while the time displayed in the entry field 87 is decreased by predetermined time every time the button 87*b* is input.

If the deletion time designation is completed, the user performs input using an OK icon 88 in the display examples shown in FIGS. 10 and 11. In addition, if the deletion time designation is stopped, the user performs input using a cancel icon 89 in the display examples shown in FIGS. 10 and 11. If the OK icon 88 is input, the processor 11 fixes the input deletion time.

Next, description will be made of the pull print job registration processing in the server 2.

FIG. 12 is a flowchart illustrating the pull print job registration processing in the server 2.

The server 2 receives the pull print job file from the user terminal 1 from the network interface 25 through the network 5 (ACT 31). The processor 21 stores the job file received from the user terminal 1 in the storage region 24a in the HDD 24.

If the job file is received, the processor 21 of the server 2 specifies the user identification information and the job request time point (ACT 32, ACT 33). For example, if the user identification information and the job request time point are included in the job file, the processor 21 extracts the user identification information and the job request time from the received job file. In addition, the processor 21 may specify the user identification information from the information obtained from the user terminal 1 during the processor 21 is connected for the communication with the user terminal 1. In addition, it is also applicable that the processor sets the time point at which the job file is received from the user terminal 1 to the job request time point.

If the user identification information and the job request time point, are specified, the processor 21 determines whether the extension time was set in the received job file as the extension condition (ACT 34). If no extension time setting was made (ACT 34, NO), the processor 21 sets "0" (no extension is made) for the extension time for the job file (ACT 35). If the extension time is set to "0", the processor 21 stores the management information in which the extension time is "0" in the management table 24d as the management information regarding the job file (ACT 42).

In addition, if the extension time setting was made (ACT 34, YES), the processor 21 sets the extension time for the job file (ACT 36 to ACT 41). If the extendable time is set in accordance with the authority given to the user, the processor 21 specifies based on the authority table 24b the authority given to the user (the user identification information of the job file) who requested the job file (ACT 36). If the authority given to the user is specified, the processor 21 specifies based on the extension time table 24c the extendable time for the authority of the user as the maximum value (extendable time) of the extension time permitted for the user (ACT 37).

In the operation example shown in FIG. 12, it is assumed that there are a case where specific extension time is designated and a case where specific time is not designated while only the fact that the extension is made is designated in the job file. If no designation is made for the extension time in the received job file, and the fact that the extension is made is designated (ACT 38, NO), the processor 21 sets the extendable time, which is the maximum value of the extension time permitted for the user, as the extension time for the job file (ACT 40). If the extension time is set to the extendable time of the user, the processor 21 stores in the management table 24d the management information in which the extension time is set to the "extendable time" as the management information regarding the job file (ACT 42).

If designation is made for the extension time in the received job file (ACT 38, YES), the processor 21 determines whether the extension time designated by the job file is within the extendable time which is the maximum value of the extension time permitted for the user (ACT 39). If the designated extension time is within the extendable time of the user (ACT 38, YES), the processor 21 stores in the management table 24d the management information in which the extension time is set to the "extension time designated by the job file" as the management information regarding the job file (ACT 42).

In addition, if the designated extension time exceeds the extendable time of the user (ACT 38, NO), the processor 21 stores in the management table 24d the management information in which the extension time is set to the "extendable time as the maximum value of the extension time permitted for the user" as the management information regarding the job file (ACT 42).

Moreover, if the designated extension time exceeds the extendable time of the user (ACT 38, NO), the processor 21 may inform the user terminal 1 as the job file sending source of the fact that the designated extension time exceeds the extendable time. Furthermore, if the sending source is notified of the fact that the designated extension time exceeds the extendable time, the processor 21 may receive the redesignation of the extension time (resending of the job file) from the user terminal 1 as the sending source. In such a case, the processor 21 may suspend the registration of the job file until the job file for which the extension time is redesignated us received from the user terminal 1.

In the job file registration processing as described above, the extension of the preservation period is set for the job file registered in the server in response to the extension request for the preservation period included in the job file received from the user terminal 1. According to such job file registration processing, it is possible to extend the preservation period for the job file registered in the server in response at the user's desire (instruction) input by the user terminal 1.

In the job file registration processing, the allowable extension time is specified as the maximum value of the extension time permitted in accordance with the user's authority, and confirmation is made regarding whether the extension time designated by the user is within the allowable extension time. With such a configuration, it is possible to limit the extension time for the preservation period of the job file to be within the allowable extension time as the maximum value of the extension time permitted in accordance with the user's authority according to the job file registration processing.

Next, description will be made of the job file management processing (deletion processing) in the server 2.

Figure 13:
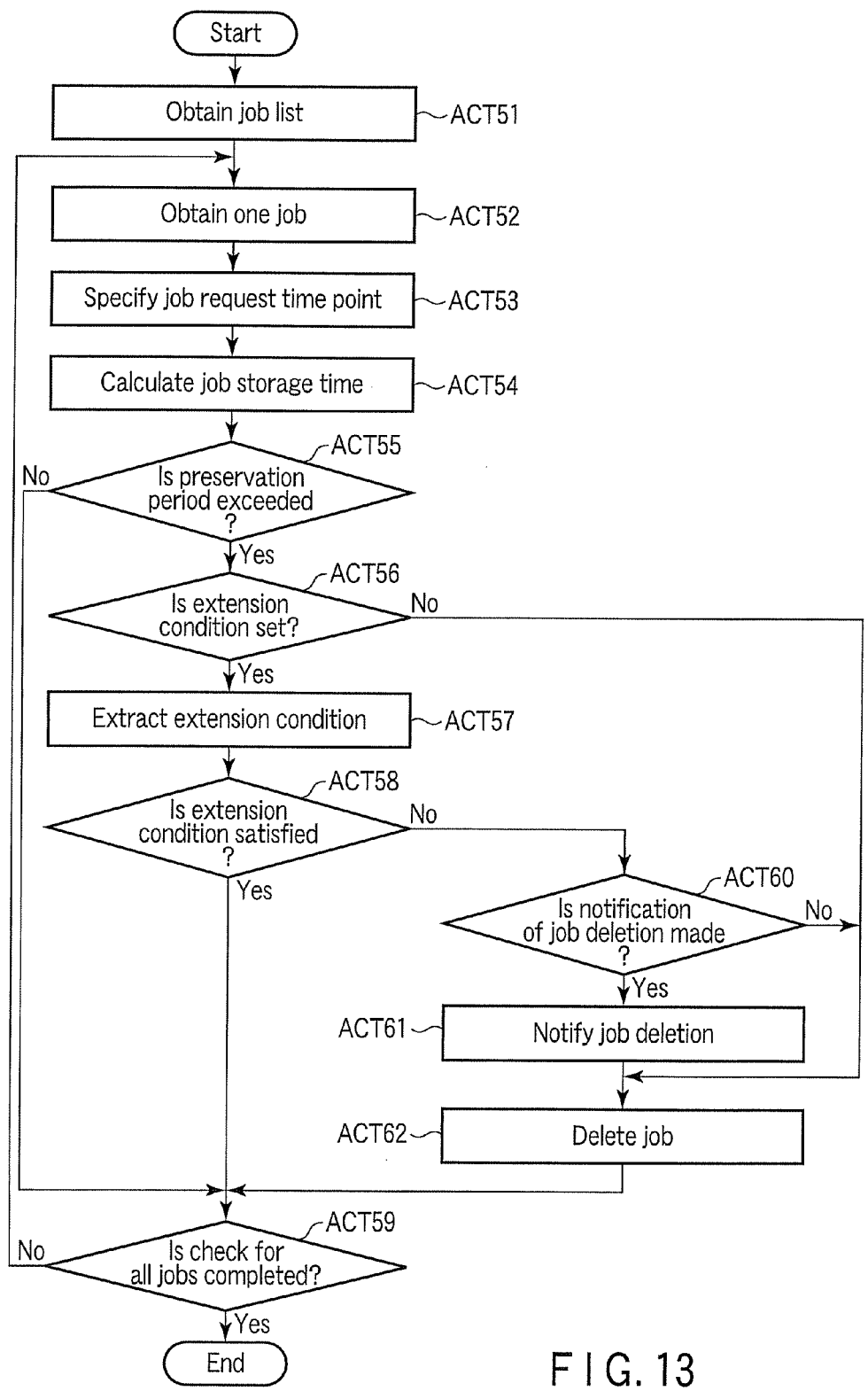
FIG. 13 is a flowchart illustrating a first example of management processing (deletion processing) for a job file in a server.

FIG. 13 is a flowchart illustrating a first example of the job file management processing (deletion processing) in the server 2.

In the server 2, the processor 21 executes the job file deletion processing as shown in FIG. 13 at a predetermined time interval (for example, 5-minute interval). The job file deletion processing shown in FIG. 13 is the processing in which the storage time of each job file is checked and the job file whose preservation period or extension time is exceeded is deleted.

As shown in FIG. 13, the processor 21 obtains a list of the management information regarding the job file being preserved in the management table 24d (ACT 51). If the list of the job files is obtained, the processor 21 checks the storage time of the job file one by one. That is, the processor 21 reads the management information of one job file (ACT 52) and specifies the job request time point in the read job file (ACT 53). If the job request time point is specified, the processor 21 calculates the storage time from the specified job request time point to the current time point measured by the clock 26 (ACT 54).

If the storage time of the job file is calculated, the processor 21 determines whether the storage time of the job file exceeded the predetermined preservation period (ACT 55). If the storage time is within the preservation period (ACT 55, NO), the, processor 21 continuously preserves the job file and determines whether the check was completed for all job files (ACT 59). If the check is not completed for all job files (ACT 59, NO), the processor 21 returns to above ACT 52 to check the storage time of the subsequent job file.

If the calculated storage time exceeds the preservation period, the processor 21 determines whether the extension condition was set for the job file (ACT 56). If determination is made in which the extension condition was set in the job file (ACT 56, YES), the processor 21 specifies the extension condition by extracting the extension condition from the management information for the job file (ACT 57). The extension time is assumed herein as the extension condition for the job file.

If the extension time as the extension condition is specified, the processor 21 determines whether the storage time of the job file is within the time obtained by adding the extension time to the preservation period (ACT 58). If the storage time exceeded the time obtained by adding the extension time to the preservation period (ACT 58, NO), the processor 21 determines whether the notification of the deletion of the job file is to be made. Whether the notification of the deletion of the job file is made may be designated by each user at the time of the job file registration, may be set in advance in accordance with the authority of the user of the job file, or may be set in accordance with the length of the set extension time.

If determination is made in which the notification of the deletion of the job file is made (ACT 60, YES), the processor 21 notifies the user of the fact that the job file is deleted (ACT 61). The notification of such deletion of the job file is made by an e-mail to the user, for example. The mail address of each user may be stored in the authority table in association with each user ID. If the notification of the deletion of the job is made (ACT 60, NO), the processor 21 deletes the job file due to the fact that the preservation period was exceeded (ACT 62) and proceeds to above ACT 59.

In addition, the notification of the job file deletion may be displayed on the display unit of the image forming apparatus 3. In order that the display unit of the image forming apparatus 3 display the notification of the job file deletion, the information regarding the deleted job file is stored and the notification of the deletion of the job file is made when the job file inquiry is received from the image forming apparatus 3. Alternatively, the notification of each job file deletion may be displayed on the display unit 16 of the user terminal 1. In order that the display unit 16 of the user terminal 1 displays the notification of the job file deletion, the information indicating the user terminal 1 as the job file sending source may be stored at the time of the job file registration, and the user terminal 1 may be notified of the fact that the job file is deleted.

If the notification of the job deletion is not made (ACT 60, NO), the processor 21 deletes the job file due to the fact that the preservation period and the extension time are exceeded (ACT 62, NO) and proceeds to above ACT 59.

If determination is made in which the storage time of the job file exceeded the preservation period and the extension condition was not set in the job file, (ACT 56, NO), the processor 21 deletes the job file due to the fact that the preservation period is exceeded (ACT 62) and proceeds to ACT 59. In addition, even if the extension condition is not set (ACT 56, NO), the processor 21 may proceed to ACT 60 to confirm the presence of the notification of the job file deletion and inform the deletion of the job file in accordance with the setting.

In the first example of the deletion processing as described above, the server determines whether the storage time of the job file for the pull print exceeded the preservation period and confirms the presence of the setting of extending the preservation period for the job file whose preservation period was exceeded. The server deletes the job file, for which the extension was not set, at the time point when the excess of the preservation period is determined while the server determines whether the job file is to be deleted based on whether the extended period was exceeded for the job file for which the extension was set. According to the first example of the deletion processing, the server can manage the job file in accordance with the preservation period extended based on the extension condition set for each job file.

If the job file whose extended period was exceeded is deleted, the notification may be made by the server 2 regarding the fact that the job file (the job file whose preservation period was extended) is to be deleted). With such a configuration, it is possible to notify the user of the fact that the job file deleted due to the excess of the extended preservation period was deleted from among the job files which are automatically deleted by the server.

Next, description will be made of a second example of the job file management processing (deletion processing) in the server 2.

FIG. 14 is a flowchart illustrating the second example of the job file management processing (deletion processing) in the server 2.

The job file deletion processing shown in FIG. 14 includes the processing of determining the deletion of each job file in accordance with the amount of the space in the storage region 24*a* which stores the job file. For example, in the processing example shown in FIG. 14, limitation is provided in the amount of the space in the storage region 24*a*, and the job file whose preservation period was exceeded is selectively deleted if the limitation of the amount of the space in the storage region 24*a* is exceeded. The processing shown in FIG. 14 may be performed at a predetermined interval or may be performed every time a new job file is registered, for example. In addition, the processing shown in FIG. 14 may be separately performed from the processing shown in FIG. 13 or may be performed in combination with the processing shown in FIG. 13.

In the processing shown in FIG. 14, the processor 21 firstly determines whether the amount of the space in the storage region 24*a* in the HDD 24 exceeds the limitation value of the amount of the space which was set in advance (ACT 71). The limitation value of the amount of the apace in the storage region 24*a* may be set as a numerical value of the data amount or may be set as a ratio of the amount of the space with respect to the capacity of the storage region 24*a*. In addition, the limitation value of the amount of the space may be stored in the HDD 24, for example.

If the free space in the storage region 24*a* exceeds the limitation value of the amount of the space (ACT 71, YES), the processor 21 determines whether the deletion of the job file whose preservation period is being extended is to be performed (ACT 72). If the determination is made in which the job file whose preservation period is being extended is not deleted (ACT 72, NO), the processor 21 determines whether the reception of the new job file (new storage of the job file into the storage region 24*a*) is inhibited (ACT 80). If the determination is made in which the reception of the new job is inhibited (ACT 80, YES), the processor 21 sets the reception of the new job (ACT 81) and completes the processing. If the determination is made in which the reception of the new job is not inhibited (ACT 80, NO), the processor 21 completes the processing without performing the job deletion.

If the determination is made in which the job file whose preservation period is being extended is deleted (ACT 72, YES), the processor 21 determines whether there is a job file whose preservation period is being extended (ACT 73). If the determination is made in which there is no job file whose preservation time is being extended (ACT 73, NO), the processor 21 proceeds to ACT 80. If the reception of the new job is inhibited (ACT 80, NO), the processor 21 sets the reception of the new job (ACT 81) and completes the processing. If the determination is made in which the reception of the new job is not inhibited (ACT 80, NO), the processor 21 completes the processing without performing the job deletion.

In addition, if the determination is made in which there is a job whose preservation period is being extended (ACT 73, YES), the processor 21 extracts the job file whose preservation period is being extended from the management table 24d (ACT 74). If the job file whose preservation period is being extended is extracted, the processor 21 decides the deletion order for the job files whose preservation periods are being extended (ACT 75). The order in which the job files are deleted is determined based on the reference set in advance. For example, the order in which the job files are deleted is decided based on the reference such as an order from the job file whose remaining period is the shortest, an order of the authority given to each user, or an order of the job types.

If the order in which the job files are deleted is decided, the processor 21 decides the job file to be deleted based on the decided order (ACT 76). For example, the processor 21 decides the job file to be deleted in the decided order such that the amount of the space in the storage region 24a is equal to or smaller than the limitation value. If the job file to be deleted is decided, the processor 21 deletes the job file which was determined to be deleted from the storage region 24a (ACT 77).

Moreover, the job file to be deleted is decided, the processor 21 determines whether the notification is necessary for the job file to be deleted (ACT 78). Whether the notification of the job file deletion is made may be designated by each user at the time of the registration of each job file, may be set in advance in accordance with the authority of the user of each job file, or may be set in accordance with the length of the set extension time.

If the determination is made in which the notification of the job file deletion is to be made (ACT 78, YES), the processor 21 notifies the user of the fact that the job file is to be deleted (ACT 79). The notification of such job file deletion is made by an e-mail to the user. The mail address of each user may be stored in the authority table in association with each user ID.

The notification of the job file deletion may be displayed on the display unit of the image forming apparatus 3. In order that the display unit of the image forming apparatus 3 displays the notification of the job file deletion, the information regarding the deleted job file may be stored, and the notification of the deletion of the job file may be made when the job file inquiry is received from the image forming apparatus 3. In addition, the notification of the deletion of each job file may be displayed on the display unit 16 of the user terminal 1. For example, the information indicating the user terminal 1 as the job file sending source may be stored at the time of the job file registration, and the user terminal 1 may be notified of the fact that the job file is to be deleted in order that the display unit 16 of the user terminal 1 displays the notification of the job file deletion.

In the second example of the deletion processing as described above, the server determines whether the space of the amount in the storage region of the job file exceeded the predetermined limitation value of the amount of the space and deletes the job file selected based on the predetermined reference from the job files whose preservation periods are being extended if the limitation value of the amount of the space is exceeded. According to the second example of the aforementioned deletion processing, it is possible to delete the job file whose preservation period is being extended, in accordance with the amount of the space in the storage region of the pull print job file.

In addition, even if the limitation value of the amount of the apace is exceeded, the server may inhibit the reception of the new job file when the job file whose preservation period is being extended cannot be deleted. By inhibiting the reception of the new job file, it is possible to further ensure the amount of the space in the storage region of the job file by the pull print execution or further ensure the amount of the space in the storage region of the job file by the manual operation of the user or an administrator.

While certain embodiments have been described, these embodiments have been presented by way of example only, and are not intended to limit the scope of the inventions. Indeed, the novel embodiments described herein may be embodied in a variety of other forms;

furthermore, various omissions, substitutions and changes in the form of the embodiments described herein may be made without departing from the spirit of the inventions. The accompanying claims and their equivalents are intended to cover such forms or modifications as would fall within the scope and spirit of the inventions

What is claimed is:

1. A server apparatus comprising:
a memory storing executable instructions;
a processor, coupled to the memory, that facilitates execution of the executable instructions to at least:
generate a determination of whether a print job received from an external apparatus includes an extension request of a preservation period of the print job;
store, with a first storage unit, user identification information and an extension condition with information indicating the print job if the determination determines that the extension request of the preservation period is included;
transfer a print job corresponding to user information included in an inquiry to an image forming apparatus as a sending source of the inquiry from among print jobs stored in the storage unit if the inquiry of the print job including the user information is received from an image forming apparatus; and
delete a print job to which an extension condition is added from among the print jobs stored in the storage unit after an elapse time from a receiving time point of the print job exceeds the preservation period and the extension condition is then further exceeded.

2. The apparatus according to claim 1, wherein the processor further facilitates the execution of the executable instructions to
store, with the storage unit, extension time for the preservation period as the extension condition.

3. The apparatus according to claim 2, where the processor further facilitates the execution of the executable instructions to
store, with a second storage unit, extendable time in association with information regarding each user as a maximum value up to which the preservation period is extended, and
store, with the storage unit, the extendable time set for a user, who instructed the print job, as the extension time.

4. The apparatus according to claim 3, wherein the processor further facilitates the execution of the executable instructions to
associate and store, with a third storage unit, Plural authorities with each user,
store extendable time in association with each authority given to each user as a maximum value up to which the preservation period is extended, and
store, with the storage unit, the extension time included in the print job as the extension condition if the extension time included in the print job is within the extendable time set for the user specified by the second and third storage unit.

5. The apparatus according to claim 1, wherein the processor further facilitates the execution of the executable instructions to
notify the print job deleted after the extension of the preservation period.

6. The apparatus according to claim 1, wherein the processor further facilitates the execution of the executable instructions to:
store, with a storage, a job file indicating a print job,
wherein the storage unit associates and stores user identification information and an extension condition with information indicating the job file stored in the storage, and
delete the job file being stored, whose preservation period is exceeded and extended based on the extension condition if an amount of a space in the storage exceeds a predetermined limitation value.

7. The apparatus according to claim 6, wherein the processor further facilitates the execution of the executable instructions to
decide the job file to be deleted from the job files being stored, whose preservation period is extended, in a deletion order based on a predetermined reference.

8. The apparatus according to claim 1, wherein the processor further facilitates the execution of the executable instructions to
store, with a storage, a job file indicating a print job,
wherein the storage unit associates and stores user identification information and an extension condition with information indicating the job file stored in the storage, and
inhibit new reception of the job file if the amount of the space in the storage exceeds a predetermined limitation value.

9. An image forming system comprising:
a memory that stores executable units; and
a processor, communicatively coupled to the memory, that facilitates execution of the executable units, the executable units including:
an operation unit of a user terminal which instructs print contents to be printed by an image forming apparatus after accumulation in a server apparatus and an extension condition of a preservation period in the server apparatus;
a generation unit which generates a print job indicating print contents to which the extension condition of the preservation period in the server apparatus is added if the extension of the preservation period is instructed by the operation unit and communicates, via a communication interface,
the print job to the server apparatus,
the server apparatus comprising:
a second memory storing executable instructions;
a second processor, coupled to the second memory, that facilitates execution of the executable instructions to at least:
generate a determination of whether the print job includes an extension condition with which preservation period is extended if the print job which can be performed in an image forming apparatus is received from the user terminal;
store, with a storage unit, user identification information and an extension condition with information indicating the print job if the determination determines that the extension condition with which the preservation period is extended is included;
transfer a print job corresponding to user identification information included in an inquiry to an image forming apparatus as a sending source of the inquiry from among print jobs stored in the storage unit if the inquiry of the print job including the user identification information is received from one image forming apparatus; and
delete a print job to which the extension condition is added from among the print jobs stored in the storage unit after an elapse time from a receiving time point of the print job exceeds the preservation period and the extension condition is then further exceeded.

10. The system according to claim 9,
wherein the operation unit of the user terminal instructs extension time as an extension condition of the preservation period,
wherein the generation unit of the user terminal generates a print job to which the instructed extension time of the preservation period is added if the operation unit instructs the extension time of the preservation period,
wherein the second processor of the server apparatus further facilitates the execution of the executable instructions to:
store, with a second storage unit, extendable time in association with information regarding each user as a maximum value up to which the preservation period is extended,
wherein the storage unit stores the extension time included in the print job as the extension condition if the extension time included in the print job is within the extendable time set for the user of the print job.

11. The system according to claim 10,
wherein the second processor of the server apparatus further facilitates the execution of the executable instructions to:
associate and store, the with a third storage unit, authority with each user,
wherein the second storage unit stores extendable time association with various types of authority as a maximum value to which the preservation period is extended, and
wherein the storage unit stores the extension time included in the print job as the extension condition if the extension time included in the print job is within the extendable time set for the user specified by the second and third storage units.

12. The system according to claim 9,
wherein the second processor of the server apparatus further facilitates the execution of the executable instructions to: notify the print job deleted after the extension of the preservation period.

13. A management method of image forming data, comprising:
determining whether a print job received from an external apparatus includes an extension request of a preservation period of the print job;
storing user identification information and an extension condition with the print job including the extension request of the preservation period in a storage unit;
transferring a print job corresponding to user identification information included in an inquiry to an image forming apparatus as a sending source of the inquiry from among print jobs stored in the storage unit if the inquiry of the print job including the user identification information is received from an arbitrary image forming apparatus; and deleting a print job to which extension condition is added from among the print jobs stored in the storage unit after an elapse time from a receiving time point of the print job exceeds the preservation period and the extension condition is then further exceeded.

14. The method according to claim 13, storing, with the storage unit, the extension time with respect to the preservation period as the extension condition.

15. The method according to claim 14, further comprising:

storing extendable time as a maximum value up to which the preservation period is extended is associated with information regarding each user in a second storage unit, and wherein the storage unit stores the extendable time as the extension time.

16. The method according to claim 15, further comprising:

storing an authority is associated with each user in a third storage unit and, wherein the second storage unit stores extendable time as a maximum value to which the preservation period is extended that is associated with each authority given to each user, and wherein the storage unit stores the extension time included in the print job as the extension condition if the extension time included in the print job is within the extendable time set for the user specified by the second and the third storage units.

17. The method according to claim 13, further comprising:

notifying about a print job deleted after the extension of the preservation period is further provided.

18. The method according to claim 17, further comprising:

storing a job file indicating a print job in a storage, storing, by the storage unit, user identification information and an extension condition that are associated with information indicating the job file is stored in the storage, and deleting, by a management unit, the job file being reserved, whose preservation period is exceeded and extended based on the extension condition if an amount of a space in the storage exceeds a predetermined limitation value.

19. The method according to claim 18, further comprising:

deciding the job file to be deleted in a deletion order based on predetermined reference from among the job files being stored, whose preservation period is being extended.

20. The method according to claim 13, further comprising:

storing a job file indicating a print job in a storage, storing, by the storage unit, user identification information and an extension condition that are associated with information indicating the job file is stored in the storage, and inhibit, by a management unit, a new reception of the job file if an the amount of space in the storage exceeds a predetermined limitation value.

* * * * *